United States Patent [19]

Taguchi

[11] Patent Number: 4,852,172
[45] Date of Patent: Jul. 25, 1989

[54] SPEECH RECOGNITION SYSTEM

[75] Inventor: Tetsu Taguchi, Tokyo, Japan

[73] Assignee: NEC Corporation, Tokyo, Japan

[21] Appl. No.: 902,817

[22] Filed: Sep. 2, 1986

[30] Foreign Application Priority Data

Sep. 2, 1985 [JP] Japan ................................ 60-194336

[51] Int. Cl.$^4$ .............................................. G10L 5/06
[52] U.S. Cl. ........................................ 381/43; 381/45;
364/513.5
[58] Field of Search ..................................... 381/41–45;
364/513.5

[56] References Cited

U.S. PATENT DOCUMENTS 3,989,896 11/1976 Reitboeck ........................ 381/42 X
4,516,215 5/1985 Hakaridani et al. .............. 364/513.5

Primary Examiner—Patrick R. Salce
Assistant Examiner—Emanuel Todd Voehz
Attorney, Agent, or Firm—Sughrue, Mion, Zinn, Macpeak & Seas

[57] ABSTRACT

A speech recognition system for recognizing the words spoken by identified speakers and unidentified speakers, based upon the use of three dimensional, polar coordinate expressions of formant information, which eliminate the differences in word patterns encountered among various speakers, and the content of a reference pattern memory which stores formant information as a reference pattern in polar coordinates. The input speech is subjected to LPC analysis for each of several analysis degrees and the resulting coefficients are time normalized against the reference pattern using a DP matching process, which may be on the basis of city block distances in order to determine the most appropriate analysis degree that represents the input speech.

6 Claims, 2 Drawing Sheets

SPEECH RECOGNITION SYSTEM

BACKGROUND OF THE INVENTION

This invention relates to speech recognition and more particularly to speech recognition systems capable of recognizing the words in speech of unidentified speakers.

Speech recognition systems are well known as a means for analyzing input speech signals and recognizing the content and the speaker of the speech.

One prior art speech recognition system utilizes spoken words as an input speech signal and registers in advance (pre-registration) the spectrum envelope parameters of a plurality of words spoken by a particular speaker as the reference patterns. When spoken words are inputted, the system determines during an analysis frame which stored reference pattern has a spectrum envelope that is in the best conformity with the spectrum envelope of each input spoken word. The closet stored word is selected as the recognized word. The speech recognition system has, in a sense, the function of speech pattern recognition.

In the speech recognition equipment of the type described above, the difficulty in recognition processing varies significantly, depending upon whether the input spoken words are from a specific known speaker or from an unidentified speaker. If the speaker is an unidentified speaker, recognition becomes extremely difficult for several reasons.

First, the acoustic features of the speech can be generally regarded as time frequency patterns that are represented by spectral envelopes having a time variant property, but this time frequency pattern changes from speaker to speaker. Furthermore, even in the case of the same word spoken by the same speaker, its time frequency pattern changes with the time of utterance. The main cause for the change in time frequency pattern is the difference of time changing speeds for each time frequency pattern. Therefore, when the speech of a specific, known speaker is to be recognized, recognition can be accomplished satisfactorily by executing a time normalization. Time normalization extends or contracts, time-wise, either the time change speed of a reference pattern of the words spoken in advance by the specific speaker or the time change speed of the words spoken at the time of analysis. The time wise extension or contraction is made of one signal with respect to the other so that the two signals come into coincidence with each other.

As with the reference pattern parameters described above, time sequence parameters also are pre-registered. Those parameters are to be analyzed in each analysis frame unit, for the full duration time that each of a plurality of words, uttered by the specific speaker, exist. On the other hand, the word uttered by the specific speaker at the time of analysis is analyzed in each analysis frame to extract the time sequence parameter. The patterns are collated by executing time normalization using the "DP technique", which extends or contracts the reference pattern or the current pattern analyzed so that their time change speeds are in the best conformity with each other. Such a DP technique generally provides an excellent recognition ratio and is known as "DP matching".

The "spectral distance" described above represents the spatial distance between various time sequence parameters as "spatial vectors". The matching of spectral distance and patterns, through the use of spatial vectors, is described in detail in Sugamura and Itakura, "Voice Information Compression in Pattern Matching Encoding", a document of Acoustic Research Group. The Acoustic Society, S-79-08, May, 1979.

If the words spoken by an unidentified speaker are to be recognized by utilizing the reference pattern of the specific speaker, the recognition ratio drops significantly. As noted above, the distribution of the spectral envelope parameter of the analyzed speech with respect to time and frequency varies from speaker to speaker and with the time of utterance. Accordingly, the only portion that can be absorbed by the DP matching technique is the change in component relating to the time change speed of the spectral envelope parameter. The portion relating to the frequency distribution resulting from the difference of speakers is not corrected.

Accordingly, there must be a correction made for each identified speaker to compensate for the recognized difference between speakers. The correction of the reference pattern for each specific speaker can provide a high recognition ratio even for the unidentified speakers.

Such a correction can be made, in principle, by use of two processing techniques i.e., time normalization and frequency normalization.

Among these two normalization processes, time normalization determines the non-linear correspondence. which is non-linear time-wise, and occurs even in the same spoken word. The correspondence is determined by extending and contracting the time distribution of the characteristic parameters: such parameters occur in words spoken by both specific and unidentified speakers. In particular, this normalization is conducted in order to identify a mapping function, which enables the analysis pattern and the reference pattern to correspond to each other on the time coordinates. Then, the reference pattern that is capable of producing the mapping function that minimizes the spectral distance by the DP matching technique is selected as the pattern which is in the best conformity with the analysis pattern.

Frequency normalization will normalize the time frequency pattern which changes with different speakers and with the time of utterance. Frequency normalization also will normalize the difference in the vocal chord waveforms by the gradient of the spectral envelope and the difference in the vocal tract length. Frequency normalization is accomplished by extending and contracting the frequency spectral envelope in the axial direction of frequency in order to normalize the difference between speakers with respect to the reference pattern. This technique uses the spectral distance as the measure for evaluation of the analysis pattern by the DP matching technique, with respect to the reference pattern, and selects the reference pattern having the optimum time frequency pattern.

Besides the techniques described above, a recognition function technique, that does not utilize the DP matching technique as speech recognition means for the unidentified speakers, has been considered as relatively effective.

The conventional speech recognition technique of the type described above for unidentified speakers involves several problems.

Processing, involving both time normalization and frequency normalization on the basis of DP matching requires an enormous processing capability. Therefore, though this processing is possible in principle, it is not easy to employ this method.

Although the identification function method has been implemented, approximately one month s processing time is necessary (even by use of a large-scale computer) to preprocess only ten words.

The present invention is directed to providing speech recognition equipment for unidentified speakers which solves the problems described above. It also eliminates the adverse influences encountered due to the differences in speaker word patterns through the use of a three-dimensional, polar coordinate expression of the first to third format frequencies extracted by the optimum analysis degree number. The invention also eliminates the need for pre-registration of spoken words and, hence, can drastically reduce the amount of calculation required in prior art system.

SUMMARY OF THE INVENTION

An object of the present invention is to provide a speech recognition system capable of significantly reducing the amount of calculation required for word identification.

Another object of the invention is to provide a speech recognition system capable of identifying words from unidentified speakers.

According to the present invention, there is provided a speech recognition system comprising, a reference pattern memory for storing reference parameters of formant information as a reference pattern, a first means for developing LPC coefficients for a respective predetermined plurality of analysis degrees for each analysis frame from an input speech signal as an input pattern, a second means for developing at least one formant information as an input pattern and a third means for providing time normalization between the input pattern and the reference pattern the time-normalization including a procedure for determining the appropriate analysis degree and the formant information for speech recognition.

Other objects and features will be clarified from the following explanation with reference to the drawings.

PREFERRED EMBODIMENTS OF THE INVENTION

Figure 1:
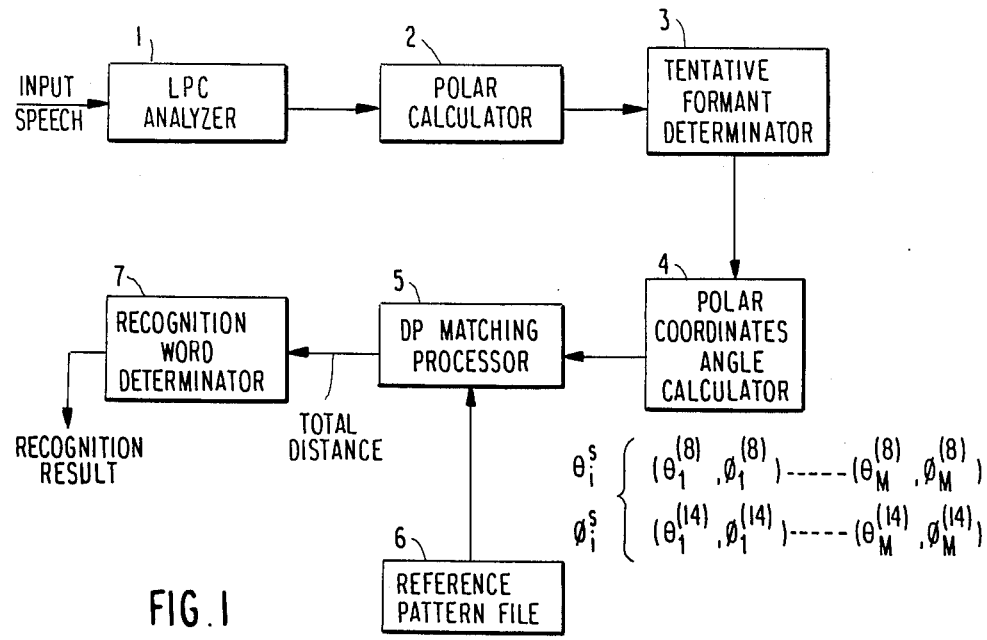
FIG. 1 is a block diagram showing the construction of the first embodiment of the present invention.

FIG. 1 is a block diagram showing voice recognition equipment constructed in accordance with a first embodiment of the present invention. The structure consists of an LPC analyzer 1, a polar calculator 2, a tentative formant determinator 3, a polar coordinate angle calculator 4, a DP matching processor 5 a reference pattern file 6 and a recognition word determinator 7.

The LPC analyser 1 places a spoken input word within a predetermined frequency range, such as 100 to 3,400 Hz, then converts it to a quantization signal having a predetermined number of bits and makes an LPC analysis. The LPC analysis is conducted within an analysis processing time unit or an analysis frame and produces, as LPC coefficients, α parameters of a plurality of analysis degree numbers. In this embodiment, continuous 8th to 14th degree α parameters are produced as LPC coefficients. However, the analysis degree number may be a plurality of continuous or interrupted numbers and the number itself may be set arbitrarily. The LPC coefficients of a plurality of sets are thus extracted so that when a polar frequency, which is expressed by ½ of the analysis degree number or an individual number below the former, is extracted in the manner which will be described elsewhere, it can be extracted as accurately as possible while keeping the best possible continuity with the data relating to the polar frequency of the analysis frames of the specific numbers. Those frames include the bandwidth of the polar frequency and have a level and frequency arrangement representative of frames before and after those of the frame to be analyzed.

The LPC coefficients of the 8th to 14th degrees are supplied to the polar calculator 2 and the polar frequency and its bandwidth are calculated.

The polar calculator 2 calculates the polar frequency by the solution of a complex equation. The frequency is determined as the root which makes a higher degree equation having each of the sets of the 8th to 14th degree LPC coefficients as its coefficient, equal to zero. This higher degree equation can be generally expressed by the following equation:

$$1+\alpha_1 Z^{-1}+\alpha_2 Z^{-2}+\ldots+\alpha_p Z^{-p}=0 \tag{1}$$

In equation (1), $\alpha_1$ to $\alpha_p$ are parameter of the analysis degree number of pth degree and $Z=e^{i\omega}$. The left side of equation (1) expresses the denominator of the right side of a transmission function $H(Z^{-1})=1/A_p(Z^{-1})$ of a linear shape prediction model, as is well known in the art.

The root of equation (1) corresponds to the even or odd number of p and can be obtained as the root of a conjugate complex number of a number equal to p/2 or below. The roots, other than the root of this conjugate complex number, are obtained as the real number root. The solution obtained as the root of the conjugate complex number provides the polar frequency.

In this embodiment, at least 3 and at most 7 polar frequencies are obtained for the 8th to 14th analysis degree numbers, and the band width is then obtained in accordance with the following equation:

$$Bi = \log \gamma_i / \pi \cdot \Delta T \tag{2}$$

In equation (2) given above, $\Delta T$ represents a sampling period of the input speech signal, $\gamma_i$ represents the root of equation (1) on the polar coordinates and $Z_i = \gamma_i e^{j\lambda i}$ represents the wavelength corresponding to the polar frequency $f_i$.

The polar calculator 2 supplies the polar frequency and the information on the band width thus obtained to the tentative formant determinator 3.

Among the formant frequencies of each of the 8th to 14th analysis degree numbers, the tentative formant determinator 3 tentatively determines the first, second and third formant frequencies for each analysis frame on the basis of an empirically set reference relating to numerous speech data. The tentative formant determinator 3 produces as outputs $f_1^{(8)}, f_2^{(8)}, f_3^{(8)}\text{---} f_1^{(14)}, f_2^{(14)},$ $f_3^{(14)}$ of the 8th to 14th analysis degree numbers, and supplies them to the polar coordinate angle calculator 4.

The formant frequencies and the distribution of their band widths are well known empirically for the first to fourth or higher range formants. Therefore, it is easy to tentatively determine the formants contained in 4 to 7 polar frequencies corresponding to the 8th to 14th analysis degree numbers that are inputted for each analysis frame and to output their first to third formant frequencies and their band widths. Real time processing of the formant frequencies, including the determination of the optimum analysis degree number, is generally very difficult and the amount of calculation required is also very great. In view of this fact, once the present invention determines tentatively the formant frequencies, it effectively determines automatically the optimum analysis degree number and simultaneously makes a real determination of the formant frequencies when the DP matching technique is subsequently conducted by processor 5.

Incidentally, the number of polar frequencies contained in a predetermined frequency band is not constant, partly because the existence of the fourth formant is not definite. In order to accurately extract the polar frequencies from the LPC coefficients, the LPC analysis degree number must be about twice the sum of the poles that are to exist in the band. If the number is greater or smaller than the above, extraction accuracy of the polar frequencies drops. On the other hand, the change of formant with time generally is slow. In view of these backgrounds, this first embodiment sets the number of the poles existing in the analysis frequency band to a minimum of 4 and a maximum of 7, calculates all the polar frequencies that are obtained for the 8th (pole number 4) to 14th (pole number 7) LPC degree numbers for each analysis frame, and selects those polar frequencies which have the best continuity with the polar frequencies of a predetermined analysis frame, which are before and after them with respect to time by DP matching processing using the DP matching processor 5.

On the other hand, the tentative formant determinator 3 outputs the formant frequencies $f_1^{(8)}$, $f_2^{(8)}$, $f_3^{(8)}$ --- $f_1^{(14)}$, $f_2^{(14)}$, $f_3^{(14)}$ of the LPC coefficient analysis degree numbers (8th to 14th). The frequencies are extracted as described already. The frequencies are limited to the first to third formants in the embodiment.

This embodiment is designed to obtain recognition of speech from unidentified speakers without the need for registration. In order to accomplish this object, the reference pattern established by a specific speaker must be adaptable to any unidentified speakers. However, the spectral distribution of the speech varies from speaker to speaker due to the fact that the vocal tract length and the characteristics of the sound source emitted from the vocal chords are different. To solve this problem, the present invention uses the three formant frequencies whose phases are mutually continuous, expresses them on the three-dimensional coordinates, and normalizes the vocal tract length through the two angular information quantities $\theta$ and $\phi$ that determine the direction in the polar coordinates system of their synthetic spectrum. Furthermore, since the distribution of the ratio of the first to third formant frequencies is independent of the particular speakers and sound source characteristics the first to third formant frequencies are selected and outputted.

Figure 3:
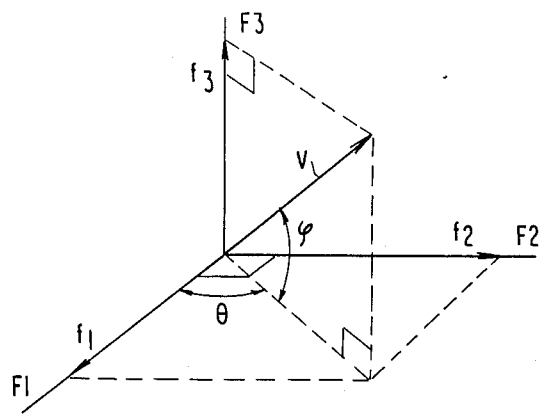
FIG. 3 is a diagram showing the three-dimensional polar system of first to third formants.

FIG. 3 shows the polar coordinates of the first to third formant frequencies.

The first to third formant frequencies are plotted on formant frequency axes $F_1$, $F_2$ and $F_3$ that cross orthogonally one another, respectively to obtain a synthetic vector V. The two angular information quantities $\theta$ and $\phi$, that determines the direction of this synthetic vector V, are parameters associated with a frequency spectrum whose degree is determined by the ratio of the formant frequencies $f_1$, $f_2$ and $f_3$. The vocal tract length is normalized through quantities $\theta$ and $\phi$ and the difference among speakers of their spectral envelope is substantially eliminated from the vocal chord sound characteristics in the system by representing the spectral envelope by the ratio of formant frequencies $f_1:f_2:f_3$.

The polar coordinate angle calculator 4 determines the set of the respective polar coordinate angles $\theta$, $\phi$ corresponding to the tentative determination formant frequencies $f_1^{(8)}$-$f_3^{(8)}$--- $f_1^{(14)}$-$f_3^{(14)}$ that are inputted thereto. The data from the set of $\theta$ and $\phi$ obtained in this manner are expressed as $(\theta_1^{(8)}, \phi_1^{(8)}), \ldots, (\theta_M^{(8)}, \phi_M^{(8)}) \sim (\theta_1^{(14)}, \phi_1^{(14)}) \ldots, (\theta_M^{(14)}, \phi_M^{(14)})$, respectively. Here, the suffixes $(8) \ldots (14) = K$ represent the analysis degree numbers, respectively, M is the maximum pattern length of the input pattern and $1 \ldots, M = J$ is a time position corresponding to the analysis frame period in the maximum pattern length time sequence.

The reference pattern file 6 determines in advance the polar coordinate angles $\theta$, $\phi$ for each analysis frame period for each of a plurality of words spoken by the specific speaker and files them as the reference pattern $(\theta_1^s, \phi_1^s), (\theta_2^s, \phi_2^s), \ldots, (\theta_N^s, \phi_N^s)$. Here, the suffix S represents the reference pattern and $1, 2, \ldots, N = i$ is a time position corresponding to the analysis frame period in the reference pattern time sequence of the maximum pattern length N. Such reference patterns are prepared in advance by use of speech data and the like on the basis of the spoken words of the specific speaker, on the premise that the data can be secured as accurately as possible in the off-line system by use of a computer system or the equipment of this embodiment.

DP matching processor 5 effects pattern matching between the input pattern thus inputted and all the reference patterns, inclusive of selection of the optimum analysis degree number, by the DP matching technique. Processor 5 also normalizes their time. This DP matching processing is effected by first obtaining a city distance (hereinafter called "distance") expressed by equation (3) for each of the input pattern and the reference pattern, and then selecting the DP path which provides the shortest total city distance (hereinafter called "total distance") as the sum of the entire length of the DP path:

$$d_{ij} = min(|\theta_i^s - \theta_j^k| + |\phi_i^s - \phi_j^k|) \qquad (3)$$

In equation (3), dij is the distance $i = 1, 2, 3, \ldots, N$, $j = 1, 2, 3, \ldots M$, $K = 8, 9, 10, \ldots 14$, S is the reference pattern and the K is the input pattern.

Figure 4:
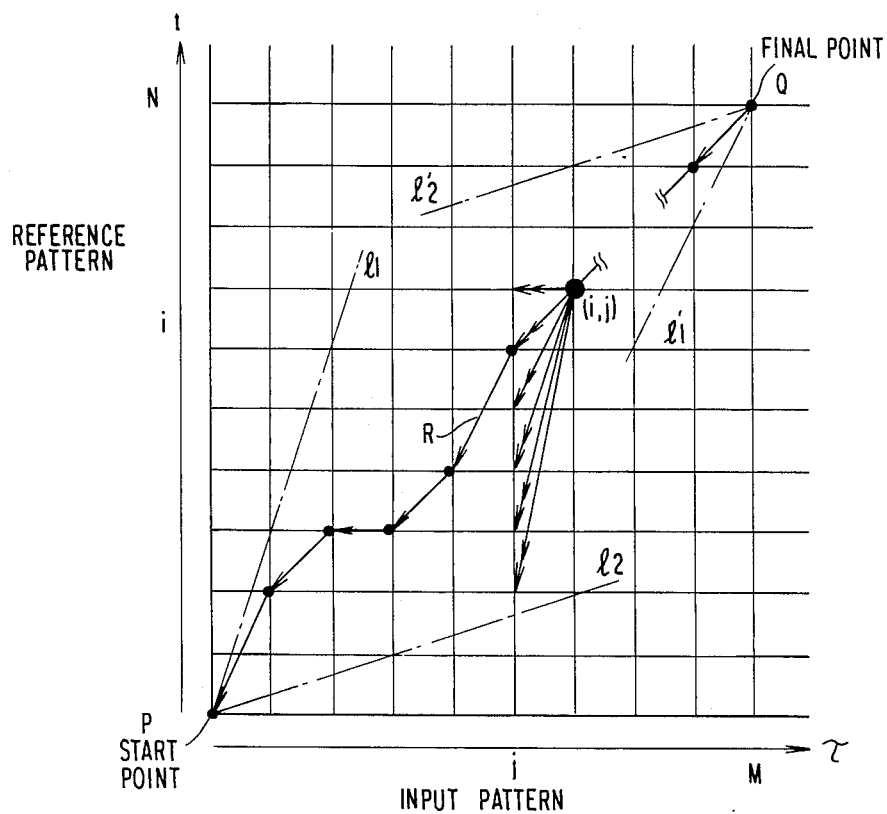
FIG. 4 is an explanatory view useful for explaining the content of DP matching in the embodiment shown in FIG. 1.

FIG. 4 is an explanatory view useful for explaining the content of DP matching in the embodiment shown in FIG. 1.

Symbols N and M on the mutually crossing time axes t and $\tau$ represent the points of time whose time positions from the start P are equal to the maximum pattern length respectively and i and j are arbitrary time points on these time axes, respectively. Lines $\phi_1$, $\phi_2$ and $\phi_1$, $\phi_2$ extending from the start point P and final point Q of the optimum DP path R, determined by DP matching, are gradient limitation lines that set the gradient limit range in which the DP path can exist.

First of all, the start points of the input pattern and the reference pattern are detected by known means to set the start point P. Next, the distance dij expressed by equation (3) for each lattice point is calculated by combining it with all the lattice points of the preceding analysis frame period.

The distance measurement between the lattice points is made by such combinations which calculate the distance between the lattice point (i, j) and each of the lattice points of the preceding one analysis frame period that are within the gradient limitation range represented by double arrows shown in FIG. 4, for example. In this measurement, such an analysis dimension number of the input pattern at each lattice point is selected so as to minimize the distance dij in accordance with equation (3), and a monotonously increasing path that minimizes the total distance amount of the DP paths thus obtained is selected as the optimum path. Selection of this optimum DP path is made for each of all the reference patterns, and the total distances corresponding to the optimum DP paths for all the reference patterns are supplied from the DP matching processor 5 to the recognition word determinator 7. The optimum DP path determination means determines the analysis dimension number of the input pattern in parallel with substantial determination of the formant frequencies.

In this embodiment, time normalization is effected in such a manner as to compress or expand the reference pattern time-wise with respect to the input pattern, but the invention can be practiced in substantially the same way by time-compressing or expanding the input pattern with respect to the reference pattern by taking into consideration the correction of matching error, or the like, or by time-compressing or expanding both the input pattern and the reference pattern. In any case, the optimum DP path R obtained in this manner is the mapping function that establishes the mapping relation between the input pattern and the reference pattern that are expressed on the mutually crossing time axes, and time normalization can be made through this mapping function.

The recognition word determinator 7 receives the total distance data on all the reference patterns for each input word speech, compares their magnitudes and outputs the reference word speech corresponding to the reference pattern, that provides the minimum total distance, as the result of recognition. In this manner, pattern matching which can be easily adapted to unidentified speakers can be executed in the system of the polar coordinate expression of the formant frequencies without the necessity of pre-registration. Moreover, extraction of the formant frequencies from the input word speech is tentatively determined on the basis of the empirical data and thereafter DP matching processing substantially determines the formant frequencies together with the optimum analysis dimension number, thereby reducing drastically the calculation quantity.

Figure 2:
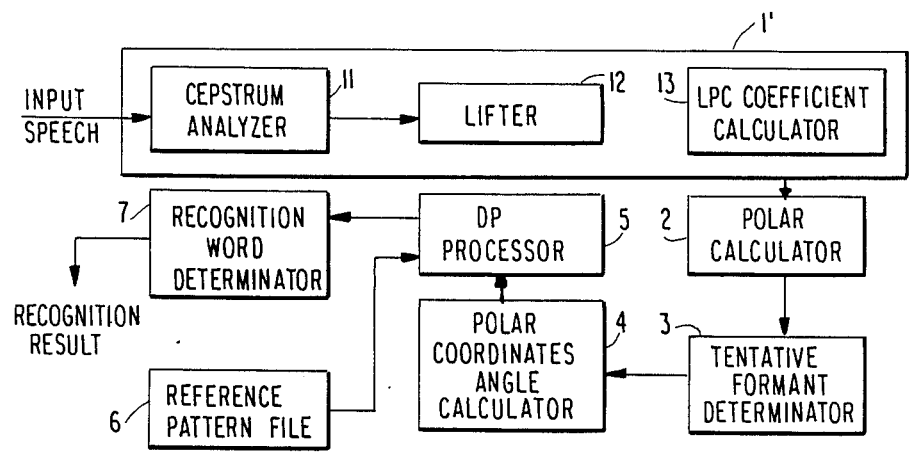
FIG. 2 is a block diagram showing the construction of the second embodiment of the present invention.

FIG. 2 is a block diagram of the voice recognition equipment in accordance with the second embodiment of the present invention.

The second embodiment shown in FIG. 2 consists of the LPC analyzer 1', the polar calculator 2, the tentative formant determinator 3, the polar coordinates angle calculator 4, the DP matching processor 5, the reference pattern file 6 and the recognition word determinator 7. The constituent elements other than the LPC analyzer 1' are the same as those of FIG. 1 and the description about them in detail will be omitted.

The second embodiment is characterized in that cepstrum analysis is effected as pre-processing of LPC analysis, and its content is as follows.

The input speech word is supplied to the LPC analyzer 1'. The LPC analyzer 1' consists of a cepstrum analyzer 11, a lifter 12 and an LPC coefficient calculator 13. The input speech word is first converted to quantitization data of a digital quantity of bit numbers set in advance by the cepstrum analyzer 11 and is then subjected to cepstrum analysis in the analysis frame unit. The cepstrum analysis in this case is executed by known means such as a sequence of steps comprising a Fourier transform of the input, conversion of the Fourier coefficient to an absolute value, its conversion to logarithm and inverse Fourier transform.

The cepstrum coefficient train outputted from the cepstrum analyzer 11 is supplied to the lifter 12, and the low frequency component among the coefficient train, that expressed primarily the vocal tract transmission characteristics, is selected. On the other hand, the high frequency component expressing primarily the sound source characteristics, such as the vocal chord vibration, is removed. After the high frequency component or the pitch period component, the cepstrum does not have information of the sound source pole, or in other words, is devoid of speaker-dependency.

The output of the lifter 12 is supplied to the LPC coefficient calculator 13. The LPC coefficient calculator 13 makes the Fourier transform of the input cepstrum coefficient train and then changes it to an inverse logarithm to generate a pseudo-waveform. Thereafter, it makes an LPC analysis, calculates an $\alpha$ parameter group for each of a plurality of analysis degree numbers and supplies the $\alpha$ parameter group to the polar calculator 2. Thereafter, the result of recognition is obtained in the same way as in the first embodiment.

Incidentally, the cepstrum analysis and its effect on the speech signals of the cepstrum analysis are well known and are described in detail in "Basis of Speech Information Processing" by Shuzo Saito and Kazuo Tanaka, published by Ohm-sha, Nov. 30, 1981.

The present invention first determines, tentatively, the first to third formant frequencies for each analysis dimension number on the basis of the polar frequency at the ratio of $\frac{1}{2}$ or below of a plurality of LPC analysis dimension numbers of the input word speech. Second, it plots these formant frequencies on the three-dimensional polar coordinates. Third, it executes time axis normalization between the polar coordinate angles $\theta$ and $\phi$ of its synthetic vector and the polar coordinate angles $\theta$, $\phi$ of the reference word speech of the specific speaker. Since the present invention is equipped with the determination means described above that can determine the input spoken words speech providing the reference patterns that can be normalized most satisfactorily by utilizing the DP matching technique, the invention makes it extremely easy to effect the determination of substantial formant frequencies, inclusive of the determination of the optimum analysis degree number, and to provide the voice recognition equipment adaptable to unidentified speakers while reducing drastically the amount of calculation and eliminating the need for pre-registration. Various changes or modifications of the embodiments shown in FIGS. 1 and 2 can be made.

For example, the LPC analysis dimension numbers in the first and second embodiments are mutually continuous 8 to 14th dimension. However, continuity and the degree number can be set arbitrarily by taking the accuracy of analysis or the like into consideration.

In the first and second embodiments, time axis normalization is made in such a manner as to make time-expansion or time-compression of the reference pattern to the input pattern and it is obviously possible to make time-compression and expansion in such a manner as to bring the input pattern into conformity with the reference pattern or to make time-compression and expansion of both of them.

Furthermore, in the first and second embodiments, LPC analysis is made in the fixed analysis frame period, it is obvious that LPC analysis is made in a variable length analysis frame period. These modifications can be readily conducted without departing from the gist of the present invention.

As described above, the present invention generates the reference pattern by two angular data $\theta$ and $\phi$ that determine the direction of the synthetic vector and are obtained by plotting the first and third formant frequencies on the three-dimensional coordinates, then tentatively determines the first to third formant frequencies of each analysis degree number on the basis of the polar frequency for each of a plurality of LPC analysis dimension numbers that are set in consideration of optimum continuity and accuracy, and executes time axis normalization between $\theta$, $\phi$ by the three-dimensional polar coordinates expression and $\theta$, $\phi$ of the reference pattern by DP matching including all the analysis dimension numbers. In this manner, the present invention provides voice recognition equipment which drastically reduces the amount of calculation involved in the extraction of the formant frequencies and the determination of the analysis dimension numbers. It also provides equipment which can be adapted to any speakers without the need of training.

What is claimed is:

1. A speech recognition system for recognizing the content of an input speech signal comprising:
   a reference pattern memory for storing reference patterns each being time-serial feature vectors of groups comprising at least first through third formant frequency information for a plurality of analysis frames;
   first means for developing LPC coefficients for each one of a predetermined plurality of analysis degrees, in each of said plurality of analysis frames, from an input pattern of said input speech signal;
   second means for developing first through third formant frequencies, for each of said plurality of analysis degrees in each of said plurality of analysis frames, from the developed LFC coefficients;
   third means for determining distances between said reference patterns and said input pattern, said input pattern being comprised of time-serially connected feature vectors for a plurality of groups of first through third formant frequency information for said plurality of frames, and each of said, groups being one of the groups of first through third formant frequency information developed for said plurality of analysis degrees in each frame; and
   fourth means for determining the reference pattern having the shortest distance from said input pattern on the basis of the distance determined by said third means as said input pattern.

2. A speech recognition system according to claim 1, wherein said predetermined plurality of analysis degrees are continuous numbers.

3. A speech recognition system according to claim 1, wherein said predetermined plurality of analysis degrees are interrupted numbers.

4. A speech recognition system according to claim 1, wherein said plurality of analysis frames is 8 to 14 in number.

5. A speech recognition system according to claim 1, wherein said plurality of analysis frames is variable.

6. A formant information extractor of an input speech signal comprising:
   a reference pattern memory for storing reference patterns each being time-serial feature vectors of groups comprising at least first through third formant frequency information for a plurality of analysis frames:
   first means for developing LPC coefficients for each one of a predetermined plurality of analysis degree, in each of said plurality of analysis frames, from an input pattern of said input speech signal;
   second means for developing first through third formant frequencies, for each of a said plurality of analysis degrees in each of said plurality of analysis frames, from the developed LPC coefficients;
   third means for determining distances between said reference patterns and said input pattern, said input pattern being comprised of time-serially connected feature vectors for a plurality of groups of first through third formant frequency information for said plurality of frames, and each of said groups being one of the groups of first through third formant frequency information developed for said plurality of analysis degrees in each frame; and
   fourth means for determining the formant frequency information of the reference pattern having the shortest distance from said input pattern of the basis of the distance determined by said third means as that of said input pattern.

* * * * *